Patented Sept. 18, 1951

2,568,659

UNITED STATES PATENT OFFICE 2,568,659

INTERPOLYMERS OF AN ALKYL ACRYLATE, A HALOALKYL VINYL COMPOUND, AND A DIVINYL ARYL HYDROCARBON

Jeston H. Powell, Jr., Akron, Ohio, assignor to The B. F. Goodrich Company, New York, N. Y., a corporation of New York No Drawing. Application December 8, 1949, Serial No. 131,907

7 Claims. (Cl. 260—80.5)

1

The present invention relates to the production of improved alkyl acrylate polymers and in particular relates to the production of thermoplastic, saturated, rubbery interpolymers from monomeric mixtures containing a major proportion of an alkyl ester of acrylic acid and a minor proportion of each of a haloalkyl vinyl compound and a divinyl substituted aryl hydrocarbon.

Polymeric alkyl acrylates, such as polyethyl acrylate are soft, thermoplastic, chemically saturated, rubbery materials which are capable of being vulcanized or cured to an essentially elastic or vulcanized condition in which they are quite useful for a number of applications because of their outstanding resistance to heat, ultraviolet light, ozone, gas diffusion and flexural breakdown.

However, several disadvantages attend the use of such polymeric alkyl acrylates as vulcanizable rubbery materials. For example, the raw polymers evidence excessive flow at elevated temperatures (such as are used in drying of a fresh coagulum resulting from coagulation of a latex) and cold flow during storage thereby necessitating special handling such as special drying apparatus and special packaging and storage techniques. In addition raw polyalkyl acrylate polymers, in spite of their softness, are tough and "nervy" during milling and especially during extrusion and calendering operations, such that it is necessary to use plasticizers, lubricants and/or undesirably high proportions of filler materials in order to obtain satisfactory smooth milled sheets, extruded articles and calendered films and coatings. Still another disadvantage in the use of polyalkyl acrylates as rubbery materials is that they require the use of special, relatively expensive curing agents and possess slow curing rates as compared to other rubbery materials.

The disadvantages attending the use of special curing agents has already partially been overcome by copolymerizing the alkyl acrylate with a small proportion of certain halogen containing monomers such as the chloroalkyl vinyl ethers and the chloroalkyl acrylates. The resulting copolymers can be vulcanized through the active halogen center by a wide range of curing agents including sulfur; quinons dioxime; certain amines and combination of amines with sulfur; as well as other curing agents such as nitrobenzene and litharge. Such copolymers, however, are otherwise subject to the same disadvantages as are the straight polyalkyl acrylates.

It is among the principal objects of this invention, therefore, to provide alkyl acrylate interpolymers which are possessed of superior raw polymer properties, which are more easily processable, which evidence faster curing rates, and which after cure are possessed of superior properties. The attainment of these and still other objects will become apparent in the description which is to follow.

I have found that when a monomeric mixture containing three essential components, namely, an alkyl acrylate, a neutral polymerizable haloalkyl vinyl compound of the type to be hereinafter defined and a divinyl aryl hydrocarbon, each in particular proportions, is subjected to polymerization there is obtained an interpolymer which has greatly improved raw polymer properties, including a pronounced improvement in cohesive strength so that it does not suffer cold flow and a pronounced improvement in processability so that it may be milled, calendered or extruded to produce smooth shaped articles of high surface gloss, and which when compounded with many types of curing agents exhibits faster curing rates than the known acrylate polymers and interpolymers.

Any of the alkyl acrylates may be employed in the monomeric mixture to be polymerized according to this invention, but those containing from 4 to 8 carbon atoms are preferred. Illustrative alkyl acrylates in this class are methyl acrylate, ethyl acrylate, n-propyl acrylate, isopropyl acrylate, n-butyl acrylate, secbutyl acrylate, isobutyl acrylate, n-amyl acrylate, and others. Best results are achieved with either methyl or ethyl acrylate since these esters yield the strongest interpolymers. It is also within the contemplation of this invention to utilize mixtures of any of the alkyl acrylates, including mixtures of two or more of the lower alkyl acrylates containing from 4 to 8 carbon atoms and mixtures containing one or more of the lower alkyl acrylates with one or more of the higher alkyl acrylates such as those containing 8 to 14 carbon atoms. The latter mixtures interpolymerize with the other two components of the monomeric mixture to produce sulfur-vulcanizable polymers which are very easily processed and which are possessed of very satisfactory curing rates.

The compounds referred to above as neutral polymerizable haloalkyl vinyl compounds, at least one of which is also used in the monomeric mixture, may be further characterized as being compounds composed exclusively of carbon, hydrogen, oxygen and halogen atoms and having a single vinyl

group separated from a haloalkyl group by an intervening oxygen-containing structure. The significance of this juxtaposition of the vinyl and haloalkyl groups lies in the fact that such haloalkyl vinyl compounds copolymerize with the alkyl acrylates to generate a polymeric chain having haloalkyl groups as side chains thusly

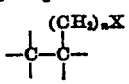

(where X=halogen) whereas other halogen-containing vinyl compounds such as vinyl chloride, vinylidene chloride or vinyl fluoride copolymerize with the alkyl acrylates to produce carbon-to-carbon chains having halogen atoms directly attached to chain carbon atoms thusly

Alkyl acrylate interpolymers having side-chain halogen substitution can be cured or "vulcanized" to a soft, strong and rubber-like condition whereas interpolymers of alkyl acrylates with such compounds as vinyl and vinylidene halides, produce only weak, brittle vulcanizates of little commercial utility.

Haloalkyl vinyl compounds containing the above-described structure which are suitable for use in this invention include the polymerizable haloalkyl vinyl esters of aliphatic monocarboxylic acids, the haloalkyl esters of acrylic acid, the haloalkyl vinyl ethers, and the haloalkyl vinyl ketones, all of which have a haloalkyl group separated from a single vinyl

group by connecting structure such as

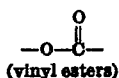
(vinyl esters)

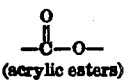
(acrylic esters)

(ethers)

and

(ketones)

The polymerizable esters of the above class which include, but are not limited thereto, vinyl chloroacetate, vinyl chloropropionate, vinyl chlorobutylrate, vinyl bromoacetate, and other vinyl esters of halogen-substituted aliphatic monocarboxylic acids, 2-chloroethyl acrylate, 2-bromoethyl acrylate, 1,2-dichloroethyl acrylate, 3-chloropropyl acrylate, 3-bromopropyl acrylate, 2,3-dichloro-1-propyl acrylate, 2-bromo-3-chloro-1-propyl acrylate, 1,3-dichloro-2-propyl acrylate, 2,3-dibromo-1-propyl acrylate, monochloroisopropyl acrylate, monobromoisopropyl acrylate, 4-chlorobutyl acrylate and other chloroalkyl esters of acrylic acid. The preferred esters are the haloalkyl esters of acrylic acid containing from 4 to 8 carbon atoms and vinyl esters of halosubstituted aliphatic monocarboxylic acids containing from 3 to 6 carbon atoms.

The polymerizable haloalkyl vinyl ethers useful in the production of polymers according to this invention have the general structure

wherein R is a haloalkyl [X—(CH₂)ₙ—] group and include, but are not limited to, chloromethyl vinyl ether, 2-chloroethyl vinyl ether, 2-bromoethyl vinyl ether, 1,2-dichloroethyl vinyl ether, 1-bromo-1-chloroethyl vinyl ether, 1-bromo-2-chloroethyl vinyl ether, 3-chloropropyl vinyl ether, 3-bromoethyl vinyl ether, 2,2,2-trichloroethyl vinyl ether, 2,3-dichloropropyl vinyl ether, 4-chlorobutyl vinyl ether and others, the haloalkyl vinyl ethers containing from 3 to 8 carbon atoms being preferred. The specific haloalkyl vinyl ether greatly preferred because of its ready availability, comparative low cost, and ability to produce superior polymers is 2-chloroethyl vinyl ether.

The haloalkyl vinyl ketones useful in this invention have the structure

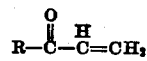

wherein R is a haloalkyl [X—(CH₂)ₙ—] group and include, but are not limited to, 2-chloroethyl vinyl ketone, 2-bromoethyl vinyl ketone, 1,2-dichloroethyl vinyl ketone, 1-bromo-2-chloropropyl vinyl ketone, 1,2-dibromoethyl vinyl ketone, 3-chloropropyl vinyl ketone, 3,3-dichloropropyl vinyl ketone, 4-chlorobutyl vinyl ketone, and other haloalkyl vinyl ketones, preferably containing from 3 to 8 carbon atoms. The preferred haloalkyl vinyl ketone is 2-chloroethyl vinyl ketone because of its ease of manufacture and its ability to produce good polymers.

The three above-described sub-classes of monomeric materials which polymerize with the alkyl acrylates to produce interpolymers containing side-chain halogen-substitution are all within the class of compounds having the general structure

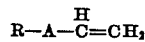

wherein R is a haloalkyl [X—(CH₂)ₙ—] group and A is a connecting linkage selected from the class consisting of

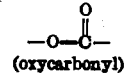
(oxycarbonyl)

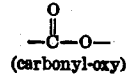
(carbonyl-oxy)

(oxy)

and

(carbonyl)

The preferred halogen atoms in the haloalkyl group are chlorine and bromine, but fluorine and iodine atoms may also be utilized.

The divinyl aryl hydrocarbons useful as the third essential component of the monomeric mixtures polymerized to form the polymers of this invention, include any of the aromatic hydrocarbons containing two vinyl,

groups attached directly to an aryl hydrocarbon nucleus. The aryl hydrocarbon nucleus may be unsubstituted except for the two vinyl groups or it may contain other hydrocarbon substituents such as alkyl groups. Illustrative compounds of this class are p-divinyl benzene (preferred), 1,3-divinyl benzene, 1,5-divinyl benzene, 1,4-divinyl-2-methyl benzene, 1,4-divinyl naphthalene, 1,5-divinyl naphthalene, 1,8-divinyl naphthalene and the like.

In the practice of the present invention, monomeric mixtures containing one or more monomers from each of the three essential classes disclosed, are prepared and subjected to polymerization. While the proportions of each of the three essential monomers in the monomeric mixture may vary somewhat, such variation must be within certain definite limits in order to produce rubbery interpolymers having the improved properties which are the objects of this invention, yet retaining the desirable properties possessed by the polymeric alkyl acrylates. For example, the mixture must contain from 80 to 95% by weight of one or more alkyl acrylates, from 2 to 20% by weight of one or more of the haloalkyl vinyl compounds and from 0.1 to 5.0% by weight of one or more of the divinyl aryl hydrocarbons. It is preferred that the mixture contain from 85 to 95% of alkyl acrylate, 2 to 10% of the haloalkyl vinyl compound and 0.5 to 4% of the divinyl aryl hydrocarbon. If the haloalkyl compound is present in an amount greater than 20% a very tough hard interpolymer is obtained which is deficient in rubber-like properties while if less than 2% of this type of monomer is utilized the resulting interpolymer is difficult to cure. If greater than 5% of the divinyl aryl hydrocarbon is utilized the resulting interpolymer is hard and difficult to process while if less than 0.1% of the divinyl compound is employed no significant improvement in processability or cure rate is obtained.

The polymerization of the above monomer mixtures may be effected by a number of known methods. For example, polymerization may be effected in solution or in a homogeneous system by the application of heat or actinic light with or without the presence of peroxygen compounds known to initiate polymerization. It is preferred, however, to carry out polymerization of the monomeric mixture in an aqueous emulsion in the presence of an emulsifying agent, a polymerization initiator and, if desired, a polymerization modifier.

Emulsifying agents which may be employed in the aqueous emulsion process include the fatty acid soaps such as sodium oleate, sodium palmitate and the like, the high molal aliphatic sulfates and the aryl and alkaryl sulfonates such as sodium lauryl sulfate, sodium isopropyl naphthalene sulfonate, and the like as well as the salts of high molecular weight bases such as the hydrochloride of diethylaminoethyloleylamide, cetyltrimethyl ammonium methyl sulfate, and lauryl amine hydrochloride.

Polymerization catalysts and initiators useful in any of the polymerization processes include benzoyl peroxide, potassium, sodium and ammonium persulfate, hydrogen peroxide, cumene hydroperoxide, and other peroxygen compounds as well as other types of polymerization initiators such as diazoamino benzene. Those soluble in hydrocarbons are, of course, preferred in the solution or homogeneous methods while those soluble in water are often preferred in the emulsion method of polymerization. Other substances which speed up the reaction such as a reducing agent in combination with one of the peroxygen compounds may be utilized. Polymerization modifiers such as the sulfur-containing modifiers including aliphatic mercaptans usually employed in the polymerization of butadiene hydrocarbons to form rubbery polymers, have much the same effect on the polymerization of the alkyl acrylates and may be advantageously employed when a very soft polymer is desired.

In the polymerization of the monomeric mixtures of this invention temperature is not critical, permissible reaction temperatures varying from as high as 100° C. or even higher down to 0° C. or even as low as −10 or −20, though the temperature preferably used is in the range of 20 to 80° C. In aqueous emulsion with temperatures of 20 to 80° C. it is possible to obtain quantitative yields of polymer in from about 1 to about 15 hours.

The preparation of the improved alkyl acrylate interpolymers of this invention will be more clearly demonstrated in the following specific examples although it is to be understood that the invention is not limited in any way by the details therein set forth.

*Example 1*

The following mixture of materials was prepared and subjected to polymerization conditions:

| Monomer mixture: | Parts by weight |
|---|---|
| Ethyl acrylate | 93.0 |
| 2-chloroethyl vinyl ether | 5.0 |
| p-Divinyl benzene | 2.0 |
| Water | 133.0 |
| Emulsifier [1] (dry basis) | 3.0 |
| Potassium persulfate | 1.0 |
| Sodium pyrophosphate | 0.7 |

[1] A sodium lauryl sulfate known as "Santomerse S."

The water, emulsifier, catalyst and buffer were charged to a reaction vessel, the vessel sealed, flushed out with nitrogen, and the contents of the reactor heated to 60° C. The monomers, which were previously washed with caustic, were then mixed and the mixture proportioned into the reactor at a uniform rate for 8 hours. The reaction was substantially complete in 10 hours with a substantially quantitative yield of polymer in the form of an excellent latex. The latex was coagulated by pouring it into hot (90° C.) calcium chloride solution. The coagulum was then filtered off, washed with clear water and dried in a mechanical convection air oven at 105° C. The coagulum had a Mooney viscosity of 40 (as determined with the Mooney viscosimeter using the large rotor, after 4 minutes at 212° F.) as against a Mooney of 54 determined in the same way for ordinary emulsion-polymerized polyethylacrylate. The coagulum evidenced no substantial tendency to flow or coalesce into a solid sheet at the drying temperature as does ordinary polyethylacrylate and copolymers of ethylacrylate with 2-chloroethyl vinyl ether. The dried crumbs were still discrete in form after drying and could be sacked in ordinary paper bags for storage or shipment or sheeted out, packed in paper, and stored in stacks without difficulty.

The dried coagulum thus obtained was milled on a cold plastic roll mill and was observed to form into a cohesive sheet with but one pass through the rolls. Ordinary polyethylacrylate and copolymers of ethylacrylate with 2-chloroethyl vinyl ether, on the other hand, have a strong tendency to stick to the rolls and unless plasticizers, fillers, etc. are added immediately will adhere to the back roll throughout the milling operation making intermixture of plasticizers, fillers, etc., very difficult. Moreover, the three-component interpolymer of this example was found to accept plasticizers, fillers, carbon black, curing agents, etc., with greater ease resulting in a saving in overall mixing time.

A portion of the three-component interpolymer of this example was mixed with compounding materials according to the following proportions:

| | Parts by weight |
|---|---|
| Interpolymer | 400.0 |
| Sulfur | 8.0 |
| Carbon black [1] | 200.0 |
| Stearic acid | 4.0 |
| Accelerator [2] | 8.0 |

[1] A carbon black known as "Philblack A."
[2] An aldehyde-amine condensation product known as "Trimine Base" and characterized as triethyltrimethylene-triamine.

The resulting composition was placed in a press between cellophane sheets, preheated to 100° C., and then cured at 298° F. for 30 minutes. The resulting vulcanizate was found to have a tensile strength of 1680 lbs./sq. in., a modulus at 100% elongation of 1570 lbs./sq. in., an elongation of 315%, a hardness of 78 as measured on the "A" durometer (after 60 minutes' cure) and a cross grain rectilinear tear strength of 80 lbs./in. Its flex life, resistance to oxidation (especially ozone) both at normal temperatures and at elevated temperatures, resistance to oils and greases, and resistance to sunlight were also found to be excellent.

Another portion of the three-component interpolymer of this example was subjected to the standard Mooney scorch test at 310° F. and found to have a cure rate, expressed in minutes, of 10. This value is to be compared with a cure rate of 70 determined in the same manner for a copolymer produced from a two-component monomeric mixture containing 95% ethyl acrylate and 5% 2-chloroethyl vinyl ether. Straight polyethyl acrylate and copolymers of 98% ethyl acrylate with 2% divinyl benzene are not vulcanizable with sulfur and their maximum cure rates with other vulcanizing agents as determined by the Mooney scorch test is about 90. Thus, the copolymerization of ethyl acrylate with both chloroethyl vinyl ether and divinyl benzene resulted in an interpolymer whose cure rate is about seven times faster than a copolymer of ethyl acrylate and chloroethyl acrylate, and about nine times faster than is possible with either a copolymer of ethyl acrylate and divinyl benzene or polyethyl acrylate itself.

*Example 2*

A mixture of 93 parts of monomeric ethyl acrylate, 5 parts of 2-chloroethyl acrylate, and two parts of divinyl benzene were emulsified in 133 parts of water containing 2 parts of sodium lauryl sulfate, one part of potassium persulfate, and one part of sodium pyrophosphate; the resulting emulsion heated to 60° C. and agitated for 8 hours whereupon polymerization was substantially complete. A substantially theoretical yield of three-component interpolymer was obtained in the form of a stable latex. The solid interpolymer was obtained by coagulation with hot calcium chloride solution.

The coagulum obtained did not soften and flow when dried at 100° C. nor did it suffer cold flow at normally temperatures. It was exceptionally plastic and when compounded with normal amounts of curing agents, fillers, carbon black etc. could be smoothly extruded about wires and cables or extruded to form hose, tubing, etc. without the usual difficulties of "nerve" which cause rough-surfaced extruded articles.

The interpolymer of this example was millmixed with 2 parts of sulfur, 50 parts of carbon black, 1 part of stearic acid, and 2 parts of "Trimine Base." One sample of this composition was cured 45 minutes at 298° F., a second sample for 60 minutes at 298° F. and a third 75 minutes at 298° F. The physical properties of the three samples were determined and compared to those of a similarly compounded and cured polymer similarly made from a monomeric mixture consisting of 95% ethyl acrylate and 5% chloroethyl vinyl ether. The table below lists the physical properties of the two polymers:

| Polymer Description | Copolymer: 95 ethyl acrylate; 5 chloroethyl vinyl ether | | | Tripolymer: 93 ethyl acrylate; 5 chloroethyl acrylate; 2 divinyl benzene | | |
|---|---|---|---|---|---|---|
| Minutes Cured at 298° F | 45 | 60 | 75 | 45 | 60 | 75 |
| Ultimate tensile strength, p. s. i | Pitted No Tests | Pitted No Tests | 1,475 | 1,400 | 1,500 | 1,500 |
| Ultimate Elongation, Per Cent | | | 400 | 550 | 150 | 125 |
| Tensile Sheet Hardness | | | 61 | 54 | 72 | 70 |
| Hardness, Shore | | | 56 | | 67 | |
| Per Cent Compression Set, A. S. T. M. Method B | | | 89 | | 50 | |
| Per Cent Compression Set, 70 hrs. @ 212° F | | | 100+ | | 76 | |
| Weeks Aged in Circulating Air Oven at 300° F | 1 | 2 | 4 | 1 | 2 | 4 |
| Ultimate Tensile Strength, p. s. i | 1,000 | 450 | 125 | 1,300 | 1,250 | 1,075 |
| Per Cent Tensile Change | −22 | −65 | −90 | −13 | −16 | −28 |
| Shore Hardness | 65 | 67 | 60 | 75 | 75 | 82 |

Comparison of the properties of the sulfur vulcanized copolymer with those of the tripolymer of this invention reveals that the copolymer was not sufficiently cured or vulcanized to be removed from the mold without damage until a curing cycle of 75 minutes was used. Inspection of the tensile, elongation and hardness values for the tripolymer, however, reveals that the curing cycle of 45 minutes resulted in slight overcure (as evidenced by progressive reduction of the elongation and increase in hardness with no accompanying increase in tensile strength).

The data of the table also reveals that the tripolymer had smaller compression set values and greater hardness at 60 minutes' cure than the copolymer cured for 75 minutes. In addition the tripolymer had much greater resistance to the effects of heat aging. For example, after heat aging for 4 weeks at 300° F. in a circulating air oven, the tripolymer had a tensile strength almost ten times that of the similarly aged copolymer, had suffered only a 28% decrease in elongation as against 90% for the copolymer, and showed an increase in hardness while the copolymer showed a softening after 4 weeks at 300° F. Thus, the addition of only 2% by weight of divinyl benzene to a monomeric mixture of ethyl acrylate and a chlorine-containing monomer produced a faster curing polymer, a polymer having better physical properties, and a polymer having greater resistance to heat aging.

Results quite similar to those of Examples 1 and 2 were obtained when using 3-chloropropyl acrylate as the chloroalkyl vinyl compound, such interpolymers exhibiting curing rates even faster than that shown by the polymer of Example 1. Still other chlorine-containing esters such as vinyl chloroacetate, vinyl chloropropionate, and 4-chlorobutyl acrylate, together with an alkyl acrylate and divinyl benzene, produced interpolymers of varying degrees of hardness and softness, all of which had good resistance to flow, were processable with great ease, and evidenced curing rates faster than those obtained with the polyalkyl acrylates or any of the alkyl acrylate copolymers. Divinyl naphthalene (1,8-divinyl) while more difficultly polymerizable than the p-divinyl benzene utilized in the above examples, enhanced both the raw polymer properties (including resistance to cold flow and processing) and the cure rates of the compounded polymers.

Although I have specifically described only representative embodiments of my invention, it will be apparent to those skilled in the art that many materials, proportions and polymerization conditions may be employed without departing from the spirit and scope of my invention.

I claim:

1. An interpolymer prepared by the polymerization of a monomeric mixture comprising from 80 to 95% by weight of an alkyl acrylate, from 2 to 20% by weight of a haloalkyl vinyl compound selected from the class consisting of compounds of the structures $$R-O-\underset{\underset{O}{\|}}{C}-\underset{H}{\overset{H}{|}}C=CH_2$$

$$R-\underset{\underset{O}{\|}}{C}-O-\underset{H}{\overset{H}{|}}C=CH_2$$

and $$R-O-\underset{H}{\overset{H}{|}}C=CH_2$$

$$R-\underset{\underset{O}{\|}}{C}-\underset{H}{\overset{H}{|}}C=CH_2$$

R being a haloalkyl radical, and from 0.1 to 5% by weight of a divinyl aryl hydrocarbon in which both vinyl groups are attached directly to the aromatic nucleus.

2. A rubbery interpolymer prepared by the polymerization in aqueous emulsion of a monomeric mixture comprising from 80 to 95% by weight of an alkyl acrylate containing from 4 to 8 carbon atoms, from 2 to 20% by weight of a chloroalkyl ester of acrylic acid, and from 0.1 to 5% by weight of p-divinyl benzene.

3. An interpolymer prepared by the polymerization of a monomeric mixture consisting of from 85 to 95% by weight of a 4 to 8 carbon atom alkyl acrylate, from 2 to 10% by weight of a 4 to 8 carbon atom haloalkyl ester of acrylic acid, and from 0.5 to 4.0% by weight of divinyl benzene.

4. An interpolymer prepared by the polymerization of a monomeric mixture consisting of from 85 to 95% by weight of a 4 to 8 carbon atom alkyl ester of acrylic acid, from 2 to 10% by weight of a 4 to 8 carbon atom haloalkyl vinyl ether, and 0.5 to 4.0% by weight of divinyl benzene.

5. An interpolymer prepared by the polymerization of a monomeric mixture consisting of from 85 to 95% by weight of ethyl acrylate, from 2 to 10% by weight of 2-chloroethyl acrylate, and 0.5 to 4.0% by weight of divinyl benzene.

6. An interpolymer prepared by the polymerization of a monomeric mixture consisting of from 85 to 95% by weight of ethyl acrylate, from 2 to 10% by weight of 2-chloroethyl vinyl ether, and 0.5 to 4.0% by weight of divinyl benzene.

7. A rubbery interpolymer prepared by the polymerization in aqueous emulsion of a monomeric mixture comprising from 80 to 95% by weight of an alkyl acrylate containing from 4 to 8 carbon atoms, from 2 to 20% by weight of a chloroalkyl vinyl ether, and from 0.1 to 5% by weight of p-divinyl benzene.

JESTON H. POWELL, JR.

REFERENCES CITED

The following references are of record in the file of this patent:

UNITED STATES PATENTS

| Number | Name | Date |
| --- | --- | --- |
| 2,404,220 | D'Alelio | July 16, 1946 |